Feb. 5, 1935.  H. BORNSTEIN  1,989,967
METHOD OF MAKING PLOWSHARES
Filed Aug. 8, 1931
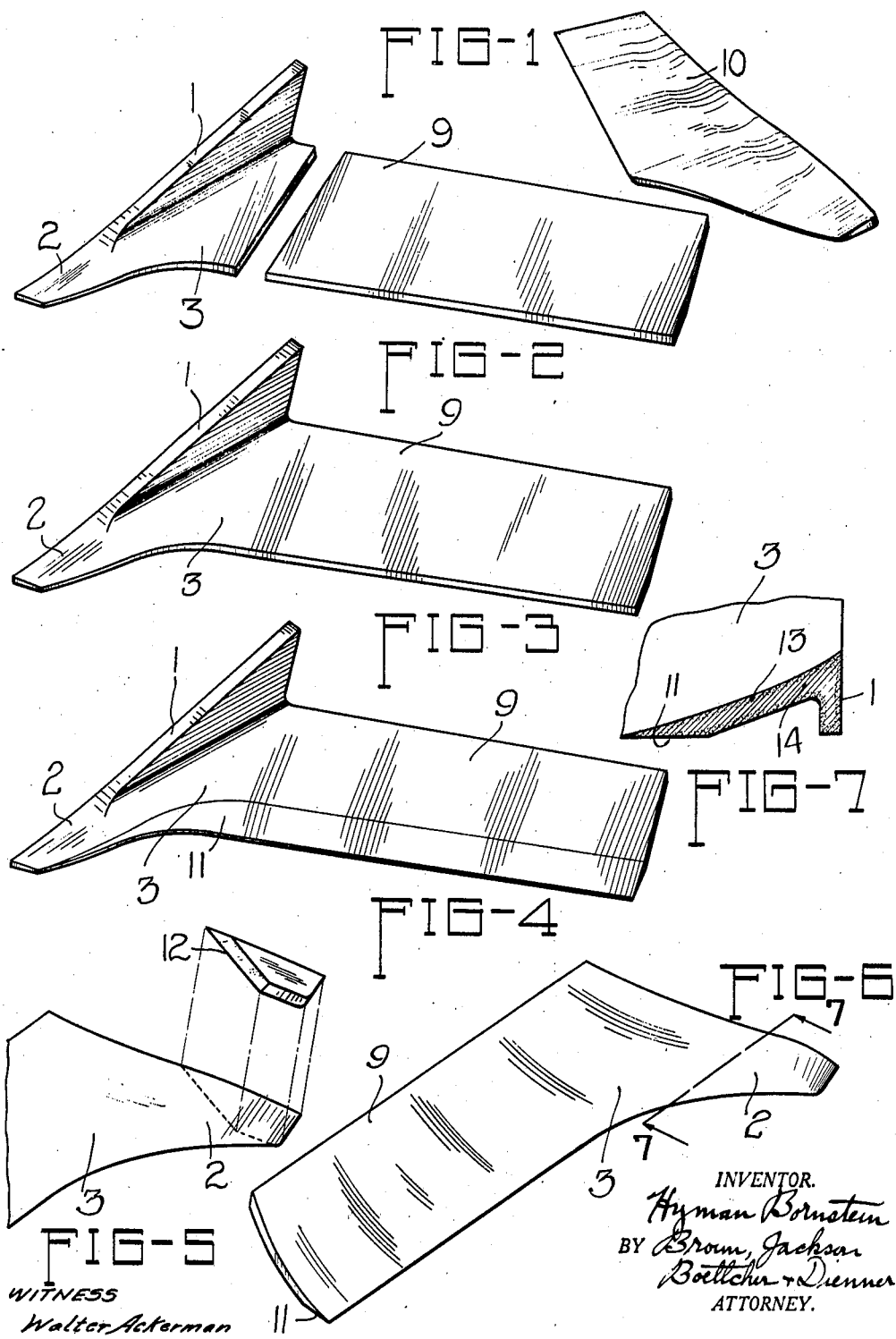

Patented Feb. 5, 1935

1,989,967

UNITED STATES PATENT OFFICE 1,989,967

METHOD OF MAKING PLOWSHARES

Hyman Bornstein, Moline, Ill., assignor to Deere & Company, Moline, Ill., a corporation of Illinois Application August 8, 1931, Serial No. 555,937

6 Claims. (Cl. 29—14)

This invention relates to plowshares, and has to do more particularly with a plowshare of novel construction and the method of producing such a plowshare.

A plowshare of ordinary type comprises the point, the blade and the landside, the latter two being disposed at a rearwardly diverging angle from their point of juncture, which forms a ridge at the front, so that together they constitute a wedge element which splits the soil of a furrow being turned from the unplowed land. It is the common practice to form the blade and the landside of the share separately, and then hammer weld the landside to the blade along said line of juncture. In the use of a plowshare the landside and the blade are subjected to severe stresses, particularly inward pressure, and as the area of greatest stress imposed upon the blade lies at the front end portion thereof adjacent to said ridge, very great strains are imposed upon a weld along its forward margin. With the advent of tractor plowing, the width and the depth of the furrows cut, and the speed at which the plows are advanced have been materially increased, with a resulting increase in the pressures to which the landside and the blade of the share are subjected. Due to this increased pressure, a considerable number of plowshares fail in use, the blade and the landside separating at the weld. In an effort to correct this difficulty, it has been proposed to forge the entire share in one piece. This has proved to be impracticable, however, due to the necessity of employing extremely large forging machines and the difficulty of obtaining accurate forging of a single article of the size and shape of a plowshare. It has also been proposed to electrically butt weld the landside to the blade but this has proved to be impractical due to the uneven surface on the inner side of the blade and the large area to be welded. Also, when the landside is formed separately from the blade, in accordance with present practice, the landside has a decided taper, the tip portion thereof tapering out to a thin point. This renders it extremely difficult and, from a practical standpoint, impossible to properly mount the landside in an electrode and to obtain the necessary uniform distribution of current flow over the entire area of the surfaces to be welded together.

I have found that it is possible to produce a plowshare in which there will be little or no danger of separation of the blade from the landside, by forming the front portion of the share, comprising the landside and a short front section of the blade, as a unit, so that they are integral with each other, and there is no weld at the ridge where they come together. This is best accomplished by forging this unit from a single piece or bar of steel, which may readily be done by making the forward section of the blade comparatively short, but long enough to extend over the area of greatest stress. Consequently, since there is no line of weld between the landside and the forward portion of the blade there is no danger of rupture, such as is encountered where these parts are welded together as has heretofore been the practice. Inasmuch, however, as it is not practicable, for the reasons above set forth, to forge the entire share, including a blade of the requisite length as a unit, the share is made in two sections or units, one comprising the landside and a short section of the blade, the other unit consisting of the major portion of the blade. Since the short forward section of the blade extends over the area of greatest stress its rear margin lies back of such area, and the forward margin of the major portion of the blade is welded to the rear margin of such forward section. Consequently, the two portions of the blade are welded together along a line disposed rearwardly of the area of maximum stresses to which the share is subjected, and the areas of the surfaces so welded together are quite small and can readily be made to contact accurately so that a perfect weld throughout the entire areas of the contacting surfaces is obtained, thus providing a much stronger weld than is possible in welding together the landside and the blade in accordance with present practice. A plowshare constructed in accordance with my invention can readily be produced at relatively small cost and is capable of withstanding much rougher usage and severer stresses than shares made in accordance with present practice, without danger of failure.

Two types of steel plowshares are in common use. One of these types is known as a "solid" share and the other is known as a "soft center" share. In the solid share a single thickness of high carbon steel, containing approximately .80 per cent of carbon, is used. In making the soft center share, in accordance with present practice, three-ply steel plate is used, this plate comprising two outer plies having a carbon content of approximately .95 per cent, and a center ply having a carbon content of approximately .10 per cent. Due to the high carbon content in the outer plies, the steel thereof will harden when subjected to heat treatment so as to provide a good cutting and wearing surface, and the relatively soft center ply imparts to the share the required toughness and ability to withstand blows and stresses to which the share is subjected. Under present practice, in both the solid share and the soft center share, the blade only can be hardened, due to the necessity of welding the landside to the blade, and in the solid share the blade only is made of high carbon steel, for the same reason. I have found that it is entirely practicable, by my invention, to form the share of a single thickness of steel and then, by carburizing the formed share to provide a protective coating of considerable depth and great hardness, this protective coating enclosing a relatively soft core. A share constructed in this manner is superior to a soft center share constructed in accordance with present practice, in that in my share the outer surfaces of both the blade and the landside are hardened to provide good cutting surfaces capable of withstanding wear and abrasion, while both the landside and the blade have a relatively soft core which imparts desired toughness thereto.

It is the object of my invention, therefore, to provide a practical method for producing plowshares by which the landside may be formed integrally with the blade in such manner that liability of separation of the landside from the blade will substantially be eliminated.

In the drawing:

Figure 1 is a perspective view, as seen from the outer side of the blade section, of the forward unit of the share, such unit comprising the landside and a short section of the blade;

Figure 2 is a perspective inner side view of the two units of the share spaced apart illustrating, with Figure 1, the first step of my method;

Figure 3 is a perspective inner side view of a plowshare constructed in accordance with my invention, illustrating the second step thereof;

Figure 4 is a view similar to Figure 3 after the share has been beveled to provide a cutting edge;

Figure 5 is a fragmentary perspective outer side view of the point of the share illustrating the step of shinning thereof, the point of the share and the shin plate being shown disassembled;

Figure 6 is a perspective outer side view of the share, viewed from the blade side thereof, after it has been formed to final shape but prior to machining;

Figure 7 is a sectional view through a plowshare constructed in accordance with my invention and carburized.

In practicing the method of my invention I first form the share in two separate units. One of these units constitutes the forward portion of the share and comprises landside 1, point 2 and a short section 3 of the blade. This unit is forged from a single piece of steel so that the landside is formed integrally with the blade section 3. This blade section and the landside constitute the forward wedge portion of the share which splits the soil of the furrow being turned from the unplowed ground and is subjected to the most severe stresses, the blade section 3 being of sufficient length to provide a straight rear edge that is disposed rearwardly beyond the area of greatest stress. In other words, the rearward terminal edge 3' of the short or stub section of the blade is spaced a substantial distance away from the ridge formed at the juncture of the forward end of the short blade section 3 with the landside 1, so that by welding the two parts of the blade together along such terminal edge 3', the line of weld is removed from or lies back of the area of greatest stress where there is little if any danger of rupture. Thus the short section 3 of the blade is integrally united with the landside for the entire length of the latter and the entire width of the blade, and is also welded to the rear portion of the blade along their entire width. The rear or terminal edge 3' of the short section 3 of the blade extends from the front or lower edge thereof to its back or upper edge, and provides a joining or welding line that does not intersect any portion of the landside and presents a straight welding surface of substantially uniform cross-sectional area. If the share is to be of the solid type, above referred to, a relatively high carbon steel is used having a carbon content of approximately .80 per cent. The other unit of the share, indicated by reference number 9, constitutes the major portion of the blade thereof. This unit 9 is preferably blanked from flat steel plate of the same grade of steel as that employed for forming the forward unit or section of the share. In forming the landside and blade section unit, the outer face of the blade section is dished transversely at the forward portion thereof, as indicated at 10 in Figure 1. The rearward portion of the blade section 3, however, is formed flat and of predetermined cross section, the rearward edge of this blade section being preferably of rectangular outline. The cross section of the rearward end portion of blade section 3 is formed to correspond to the cross section of the plate from which the major portion of the blade, or unit 9, is blanked. The two units of the blade can readily be produced with accuracy by ordinary forging and shearing means.

Since the rearward end of blade section 3 corresponds in cross section to the forward end of unit 9, this latter unit can be positioned with facility with its forward end in accurate contact with the rearward end of blade section 3. Since blade section 3 and unit 9 are both of similar and restricted cross area, the area of the weld to be made is quite small. After the surfaces to be welded together have been fitted together, blade section 3 and unit 9 are electrically butt welded together. This completes the structure of the blade of the share, after which the weld is ground down smooth and the entire share may be rough ground to remove scale. The share then appears as in Figure 3 and is ready for subsequent treatment to give it its final form. However, such further treatment, hereinafter described, is not a part of my present invention.

The share of Figure 3 is then subjected to "plating," the term used in the art to indicate the grinding or beveling of the lower portion of the blade and point at 11 to provide a cutting edge. After the plating operation, the share is then subjected to the "shinning" operation, during which the plate 12 is hammer welded onto the point, as indicated in Figure 5, to provide a reinforcement therefor, since the point receives the greatest amount of wear. The blade of the share is then subjected to a "shaping" operation, during which the share is heated and is formed under a drop hammer to impart to the outer face of the blade the proper curvature, shown in Figure 6, which curvature forms a continuation of the curvature of the mold board when the share is applied to a plow. In this connection, the initial dishing of the blade section 3, in the forging of the same and the landside, is of material assistance in the final shaping operation of the entire share to impart the desired form or curvature thereto.

While it is preferable to blank the major portion of the blade, or unit 9, from plate stock, this is not essential and unit 9 may be forged, it being desirable that the rearward portion of blade section 3 and the forward end portion of unit 9 be of substantially the same cross section in order that these two units may be butt welded together with facility and accuracy so as to assure a strong weld therebetween.

In the event that it is desired to produce a soft center share, the two units thereof are formed as before but instead of employing high carbon steel a low carbon steel containing approximately .15 per cent of carbon is used. From a welding standpoint this is advantageous, as low carbon steel will weld more readily than high carbon steel. After the two units of the share have been welded together, and the share has been rough ground as above described, the formed share is carburized to a depth of approximately one-third the thickness of the blade thereof. This carburizing of the share is effected in a manner known in the art and which need not be described here in detail. As a result of the carburizing operation, and the subsequent heating and shaping of the share, the finished share has an outer protecting coating or layer 13 of great hardness which encloses a relatively soft core 14 which imparts desired toughness to the share. It is to be noted that the share is formed of a single thickness of steel, the core 14 being an integral part of this thickness so that there is no tendency of the core and the outer relatively hard protecting coating 13 to separate. A further advantage of this construction is that the entire surface of the share, including the landside as well as the blade and the point, may be hardened. In these respects, the share of my invention is a distinct improvement over the present type of soft center share now in general use.

By my invention I render it possible, from a practical standpoint, to construct a plowshare in which the blade and the landside are integrally united and liability of the landside separating from the blade is obviated.

After the share has been shaped, it is subjected to a machining operation, which includes milling a moldboard edge, cutting the landside to the proper length, and punching and placing the usual fixtures on the back of the blade by which the share is held to the frog of the plow bottom. This operation is known in the art, constitutes no part of my invention, and need not be illustrated nor described here in detail.

What I claim is:

1. The method of producing a plowshare, which comprises forging as a unit the forward portion of the share, consisting of the landside and a short section of the blade integrally united in angular relation to each other for the full length of the landside and the full width of the blade, said blade section having a straight rear edge, disposed rearwardly beyond the area of greatest stress blanking the main portion of the blade as a separate unit from plate stock of approximately the same cross-section as the rearward end portion of the short blade section, and then welding the forward end surface of the main portion of the blade to the rearward end surface of said blade section.

2. The method of making a plowshare which consists in forming the forward portion of the share as a unit by shaping a single piece of metal to form the landside and a short section of the blade in conventional angular relation to each other and integrally united in such relation for the entire length of the landside and from the point of the share to the upper margin of said blade section, said blade section having a straight rear edge spaced from the landside and disposed rearwardly of the area of greatest stress, forming the main section of the blade as a separate unit with a straight front edge, and then welding together the rear and front end surfaces of said blade sections, respectively, to produce a unitary share.

3. The method of making a plowshare which consists in forming the forward portion of the share as a unit by forging a single piece of metal to form the landside and a short section of the blade in conventional angular relation to each other and integrally united in such relation for the entire length of the landside and from the point of the share to the upper margin of said blade section, said blade section having a straight rear edge spaced from the landside, and disposed rearwardly of the area of greatest stress, forming the main section of the blade as a separate unit with a straight front edge, and then welding together the rear and front end surfaces of said blade sections, respectively, to produce a unitary share.

4. The method of producing a plowshare, which comprises forging as a unit the forward portion of the share, consisting of the entire landside and a short section of the blade of full blade width and having a straight rear edge spaced a substantial distance from the juncture of the landside and blade, forming as a separate unit the main portion of the blade with the forward end thereof corresponding in cross-section to the cross-section of the rearward end of the short blade section, and then welding the forward end surface of said main portion of the blade to the rearward end surface of the short blade section.

5. The method of producing a plowshare, which comprises forging as a unit the forward portion of the share, consisting of the landside and a short section of the blade integrally united in angular relation to each other for the full length of the landside and the full width of the blade, said blade section having a straight rear edge spaced a substantial distance from the juncture of the landside and blade, transversely dishing the forward portion of said blade section during the forging operation and forming the rearward end portion thereof flat and of substantially uniform cross-section, blanking the main portion of the blade as a separate unit from flat plate stock of the same cross-section as the rearward end portion of said short section, and then welding the forward end surface of the main portion of the blade to the rearward end surface of said short blade section.

6. The method of producing a plowshare, which comprises initially forming the share in two separate units, one of which includes the landside and a short section of the blade integrally united in angular relation to each other for the full length of the landside and the full width of the blade, said blade section having a straight rear edge spaced a substantial distance from the juncture of the landside and blade, so that it is disposed rearwardly of the area of greatest stress, and the other of which units consists of the major portion of the blade provided with a straight forward edge, and then welding said edges together to form the complete share.

HYMAN BORNSTEIN.